United States Patent
Green

[11] 3,711,823
[45] Jan. 16, 1973

[54] ACOUSTIC TO OPTICAL IMAGE CONVERTER USING AN ACOUSTIC GRATING

[75] Inventor: Philip S. Green, Redwood City, Calif.

[73] Assignee: American Express Investment Company, San Francisco, Calif.

[22] Filed: July 27, 1970

[21] Appl. No.: 58,442

[52] U.S. Cl. ............ 340/5 I, 332/7.51, 340/5 H, 350/161, 181/.5 NP, 73/67.5 H
[51] Int. Cl. ............................................. H01s 3/02
[58] Field of Search ............ 332/7.51; 340/5 H, 5 I; 350/161, 3 S; 181/.5 NP; 73/67.5 H

[56] References Cited

UNITED STATES PATENTS

| | | | |
|---|---|---|---|
| 3,594,717 | 7/1971 | Macovski | 340/5 H |
| 3,574,616 | 4/1971 | Mueller | 350/162 SF |
| 2,643,286 | 6/1953 | Hurvitz | 340/5 MP |
| 3,419,322 | 12/1968 | Adler | 332/7.51 |
| 3,097,522 | 7/1963 | Weller, Jr. | 340/5 I |

OTHER PUBLICATIONS

Smith, "Studies of Resolution in a Bragg Imaging System" 1/70, pg. 1062-1068, JASA Vol. 49, No. 3.
Korpal, "Rigid Sampling of Acoustic Holograms by Laser Scanning Techniques," 5/68, pg. 881-884, JASA, Vol. 45, No. 4.
Massey, "An Optical Heterodyne Ultrasonic Image Coverter," 12/68, Proceeding of IEEE, Vol. 56, No. 12.

Primary Examiner—Samuel W. Engle
Assistant Examiner—N. Moskowitz
Attorney—Townsend and Townsend

[57] ABSTRACT

A system for converting an acoustic wave field to a light wave field including an acoustically transmissive medium, a solid elastic or liquid reflective interface at a boundary of the medium, means for generating an acoustic wave field in the medium, means for optically detecting the acoustic wave field incident at the reflective interface, and a grating or grid immersed in the acoustic medium adjacent to but spaced from the reflective interface. The grating is formed of a material having an acoustic impedance different from the medium thereby to superimpose the acoustic wave field on a spatial frequency carrier.

24 Claims, 5 Drawing Figures

PATENTED JAN 16 1973 3,711,823
SHEET 1 OF 2
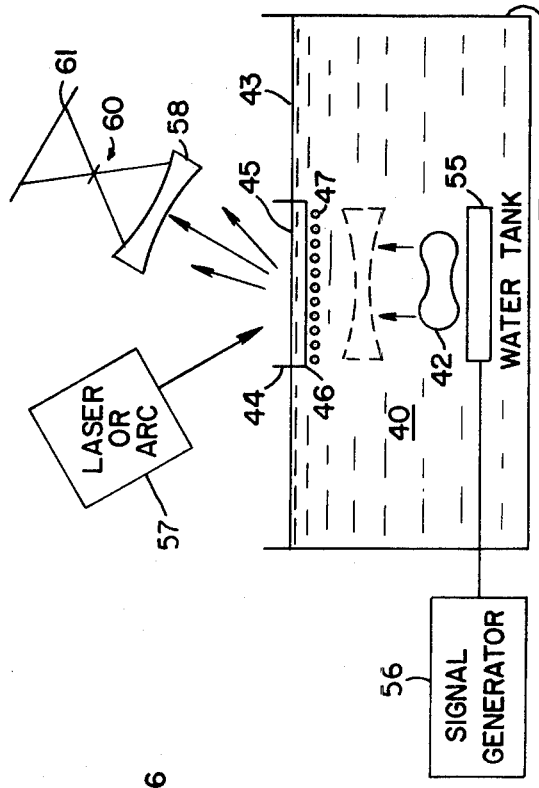
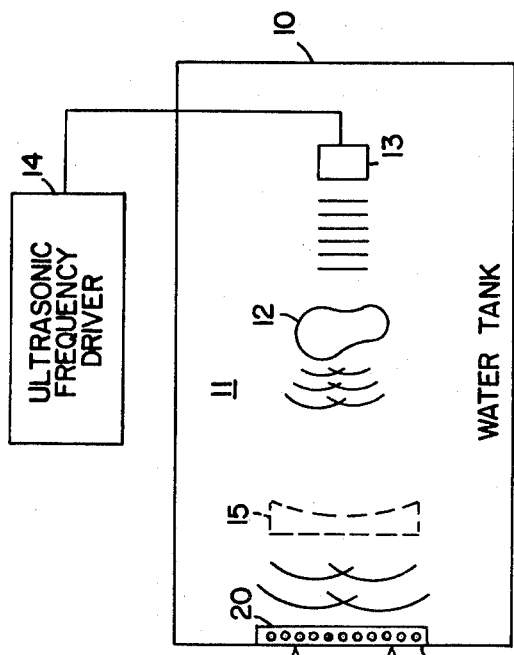
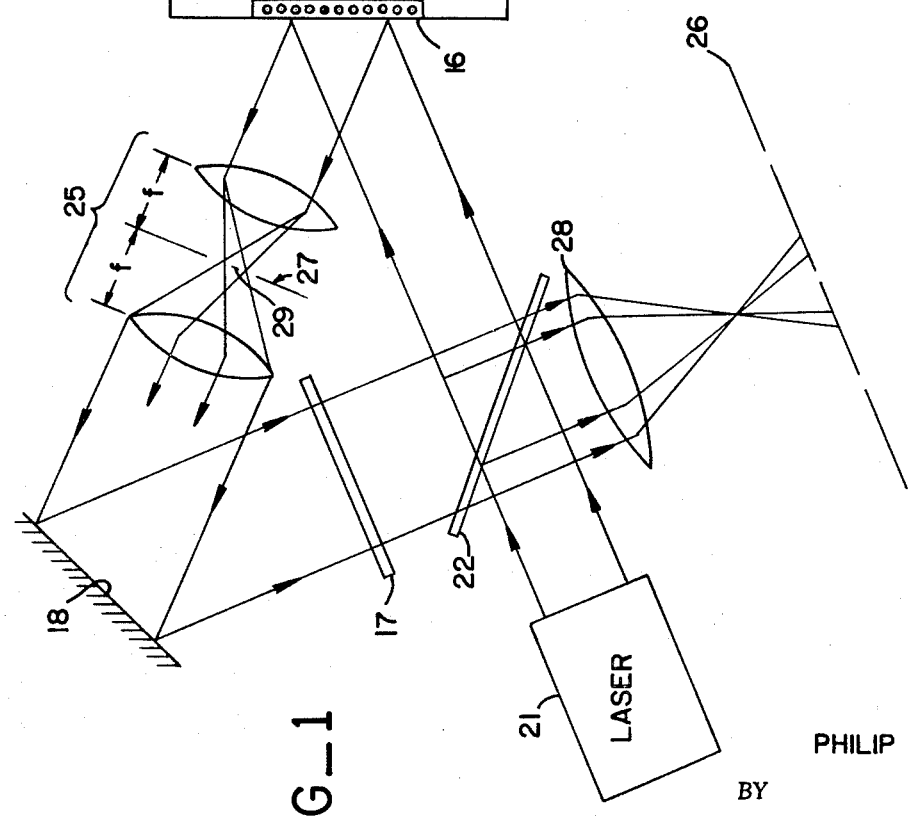
INVENTOR.
PHILIP S. GREEN
BY
Townsend and Townsend
ATTORNEYS

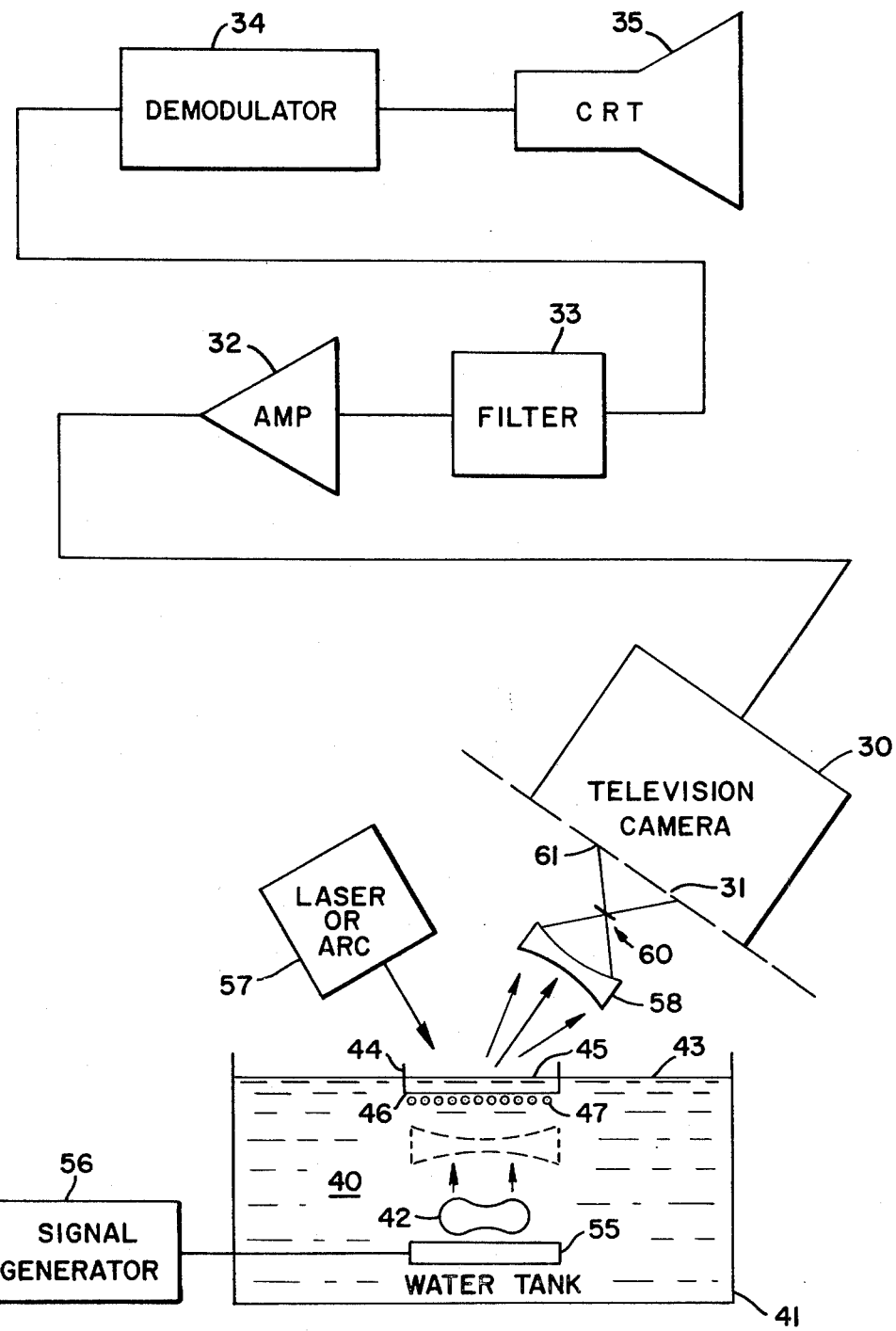
FIG_2

ACOUSTIC TO OPTICAL IMAGE CONVERTER USING AN ACOUSTIC GRATING

This invention relates to an improvement in acoustic to optical image converters of the types which utilize the diffraction of coherent light from a reflective solid elastic or liquid surface for detecting an acoustic wave field originating from an insonified object and incident on the reflective surface. The invention thus provides an improved system for visualizing acoustic shadow images, acoustic focused images, and acoustic holograms, and is applicable in such fields as non-destructive testing, medical diagnostics, underwater viewing, and ultrasonic imaging generally.

In acoustic to optical image converters of the types referred to herein there is generally provided an acoustically transmissive medium such as a fluid confined in a tank in which is immersed an object to be imaged. The object is acoustically illuminated or insonified and the acoustic wave field originating from the insonified object impinges on an optically reflective solid elastic or liquid surface formed at one of the boundaries of the medium. The acoustic wave field or image impressed and displayed on the reflective surface is thereafter optically detected according to one of a variety of techniques using the diffraction of coherent light reflected from the surface. The detected image is thereafter processed either electronically or optically to provide an optical image of the immersed object.

Examples of prior art in acoustic to optical image converters of these types are described in A. F. Metherell, et al., Eds., "Acoustical Holography," (Plenum Press, New York, 1969) (liquid surface); G. A. Massey, Proc. IEEE 65, 2157 (1968) (solid elastic surface); Korpel and Desmares, J. Acoust. Soc. Amer. 45, 881 (1969) (solid elastic surface); U.S. Pat. application, Ser. No. 864,351, entitled "Sonic Transducer," filed on Oct. 7, 1969, now U.S. Pat. No. 3,594,717; and U.S. Pat. application, Ser. No. 7486, entitled "Acoustic to Optical Image Converter" filed on Feb. 2, 1970.

In methods of ultrasonic image conversion which utilize the diffraction of coherent light from a reflective surface deformed by an incident ultrasonic wave, the undiffracted portion of the reflected light is often many orders of magnitude greater than the image bearing diffracted light resulting in poor image contrast. In particular, this occurs when the ultrasonically induced surface deformations in the elastic reflective interface are small compared to the optical wavelength of the detecting coherent light. Although optical spatial filtering of the light can be used to remove some of this undiffracted light, the filtering generally also deletes low spatial frequency information from the image. Furthermore, phase-contrast imaging techniques generally used in detecting an acoustic field incident on a liquid surface cannot reproduce low spatial frequencies.

It is, therefore, an object of the present invention to provide a new and improved acoustic to optical image converter of the type utilizing the diffraction of light from a reflective surface for detecting an acoustic field which permits improved separation of diffracted portions of the light containing image information and undiffracted portions of the reflected light, and which can be implemented by both coherent and non-coherent light.

Another object of the invention is to provide an acoustic to optical image converter with improved sensitivity and response in detecting and converting low spatial frequency image information.

In order to accomplish these results, the present invention contemplates providing a system for converting an acoustic wave field to a light wave field of the type using an acoustically transmissive medium, a solid elastic or liquid reflective interface at a boundary of the medium, means for generating an acoustic wave field in the medium, and means for optically detecting the acoustic wave field impressed at the reflective interface, in which a grating is immersed in the acoustic medium adjacent to but spaced from the reflective interface. According to the invention, the grating is formed of a material having an acoustic impedance different from the medium in which it is immersed thereby to modulate the acoustic wave field impressed or displayed at the elastic or liquid reflective surface onto a spatial frequency carrier.

The grid or grating contemplated by the present invention can consist of an array of fine lines of material such as wires, air spaces, or other material having an acoustic impedance different from that of the surrounding medium. The lines of the grating can be arranged in parallel or perpendicularly or oriented randomly. Thus, for example, the grid can consist of coplanar parallel lines of material such as wires or hollow tubes of air. In one form of the invention the grid consists of a layer or plate of solid material having hollow channels formed therein, and in another embodiment of the invention the grid consists of an array of wires either bare or embedded in plastic.

A feature and advantage of the present invention is that an acoustic field originating from an object and incident on the reflective surface is modulated onto a spatial carrier sufficiently offsetting the spatial frequencies of the image from the center of the resulting diffraction pattern so as to facilitate filtering and separating the undesirable undiffracted light from the diffracted light containing the image information.

Another feature and advantage of the acoustic grating contemplated by the present invention is that a reference wave is not necessary for superimposing the acoustic field on a spatial frequency carrier. In conventional systems a reference wave is used to produce interference fringes which provide the spatial carrier. Because a reference wave is not necessary in the present invention, the position of the imaged object with respect to the reflective surface is less critical and the insonifying waves need not be coherent. Broadband insonification which produces images of greater quality can be used. Furthermore, larger acoustic to optical converter surfaces can be used and direct transmission images can be produced by placing objects just beneath the converter surface, there being no reference wave field to obstruct.

The invention also contemplates a variety of techniques for optically detecting and filtering the desired frequency components corresponding to the image to be reproduced from undesired frequency components. Different techniques are used in detecting an acoustic wave field depending upon whether it is impressed at a solid elastic surface or a liquid interface.

According to one embodiment of the invention, a liquid reflective surface or interface upon which the acoustic field is impressed is illuminated with a beam of coherent light which is after reflection by the surface optically filtered using optical spatial filters for separating the spatial frequencies corresponding to the image information from the undiffracted light. The spatial frequency carrier is also eliminated by optical spatial filtering. A feature of this aspect of the invention is that when using optical spatial frequency filtering of the detected wave field, the grid or grating immersed in the acoustic medium can consist of a random array or of coplanar lines of material having an acoustic impedance different from that of the medium.

According to another aspect of the invention, a coherent beam of light reflected from the liquid reflective surface on which the acoustic wave field is impressed is imaged onto a vidicon or television camera in order to permit electrical filtering. The image is scanned generating an electrical signal having frequency components corresponding to the image information superimposed on a carrier whose frequency is determined by the spatial frequency of the grating immersed in the acoustic medium and imaged by the diffracted light. In the case of electrical filtering, the acoustic grating is formed of coplanar parallel lines across which the camera scans thereby generating a temporal frequency carrier corresponding to the spatial frequency carrier. The frequency components corresponding to image information modulated on the carrier frequency are thereafter demodulated and filtered and displayed on an electronically addressable optical display such as a cathode ray tube. A combination of optical spatial filtering and electrical filtering can also be used.

In using a solid elastic surface, time-varying deformations of the elastic surfaces are detected by reflecting coherent light waves from the surface and imaging them onto a storage-type television camera. Time variations in surface position cause corresponding time variations in the phase of the reflected light. These variations are converted to stationary patterns of light intensity in the television camera by superimposing onto the camera a coherent reference light field that, for example, has been shifted in optical frequency by exactly the frequency of the acoustic waves. By inserting the grating just before the elastic surface, the image is modulated onto a spatial frequency carrier and most of the undiffracted light is removed by a spatial filter in the focal plane of the imaging lens. A combination of spatial filtering and electrical filtering can also be used.

Other objects, features and advantages of the present invention will become apparent in the following specification and accompanying drawings.

In the drawings:

FIG. 1 is a diagrammatic view of acoustic to optical image converter using a solid elastic reflective surface and an acoustic grating.

FIG. 2 is a diagrammatic view of a similar acoustic to optical image converter.

FIG. 3 is a diagrammatic view of a portion of an acoustic to optical image converter using an optical grating in which the reflective interface is formed by a liquid.

FIGS. 4 and 5 are fragmentary side cross-sectional views of acoustic gratings embodying the present invention.

Referring to the system of FIG. 1, an object 12, the acoustic image of which is to be visualized, is immersed in an acoustically transmissive fluid 11 such as water retained within the tank 10. A transducer 13 provides an acoustic source for insonifying, i.e., irradiating with acoustic energy, the object 12. The resulting acoustic wave field originating from the insonified object 12 impinges on a solid silvered or otherwise reflective elastic interface or plate 16 of a material such as, for example, glass or plastic, which forms a portion of the boundary of the tank confining the liquid 11. The acoustic field incident on the elastic surface 12 produces a pattern of time-varying perturbations or deformations across the surface representative of the acoustic field alternating at the acoustic frequency. This pattern is referred to herein as an "acoustic image" of the insonified object, "displayed" on the elastic surface 16. Ideally, the thickness of the elastic surface 16 is an odd number multiple of the half wave length of the acoustic frequency originating from source 13.

In the example shown in the figure insonification of the object 12 by source 13 is from behind the object so that the acoustic image displayed on surface 16 represents a transmissive wave field. The acoustic field transmitted through object 12 is diffracted by the object to produce an interference pattern or acoustic hologram containing amplitude and phase information not only about the surface of the object but also about the internal characteristics of the object. For acoustic holography applications, sinusoidal or temporally coherent sonic ultrasonic energy is preferably used. For acoustic focused imaging, an acoustic lens 15 can be interposed in the acoustic wave path to produce a focused acoustic image on the elastic surface 16. For acoustic holography and acoustic focused imaging, insonification can also be accomplished from the side or the front of object 12 so that the acoustic image displayed on the elastic surface is a reflected acoustic wave field. Thus, insonification from the front or from a front angle produces back scatter waves for an acoustic hologram or acoustic focused image representative of the reflective surfaces of the object.

As shown in FIG. 1, there is interposed in the path of acoustic waves originating from object 12 and incident on surface 16 a grating consisting of a coplanar row of spaced parallel lines or lengths of material having an acoustic impedance different from that of the medium 11. The grating 20 is immersed in the fluid and positioned adjacent to but spaced from the elastic reflective surface 16. The acoustic wave field directed through the grating 20 is thereby diffracted and the acoustic wave field originating from object 12 is superimposed on a spatial frequency carrier. The superimposed acoustic wave fields are impressed and displayed on the elastic surface 16 in a pattern representative of a superposition of the object 12 and the grating 20.

In order to visualize the acoustic wave field displayed at the interface 16, i.e., in order to convert the acoustic wave field into an optical wave field an optical interferometer is employed. One suitable interferometer is illustrated in FIG. 1, wherein there is provided a laser 21 which illuminates the surface 16 with coherent light directed through beam-splitter 22. The portion of coherent light from laser 21 passing through beamsplitter 22 thus illuminates the entire surface 16 and is phase-modulated by the oscillating perturbations induced at the interface by the acoustic wave to form a diffracted beam of light. The reflected and diffracted object light from surface 16 is projected through lens system 25 which focuses the light onto a mirror surface 18. Mirror 18 reflects the beam through a light modulator 17 and beam-splitter 22 to combine with the reference light from laser 21 initially reflected by beamsplitter 22. The recombined light beams are focused by lens 28 onto image plane 26. Light modulator 17 is driven at the same frequency as acoustic frequency driver 14 to shift the object light beam in optical frequency by an amount equal to the acoustic frequency. By this expedient, time variations in surface positions of the reflective surface 16 are converted to stationary patterns of light intensity at the target of a storage-type television camera which is positioned at image plane 26. It is generally the case that the undiffracted coherent light reflected from surface 16 exceeds by several orders of magnitude the diffracted coherent light so that the image displayed at image plane 26 is impaired by the intensity of undiffracted light. Because of the use of acoustic grating 20, however, filtering of the undiffracted portions of the light from the diffracted portions of light containing the image information is greatly facilitated.

In the embodiment of the invention shown in FIG. 1, separation of the undiffracted and diffracted portions of the light is accomplished by spatial frequency filtering. The spatial frequency filter which may, for example, consist of a binary mask is positioned appropriately in the Fourier transform plane 27 of the object light passing through lens system 25. According to the well-known principle of optics, the optical display at the transform plane 27 consists of an effective diffraction pattern constituting a spectrum of the spatial frequencies of the image detected by the light. Because of the use of the acoustic diffraction grating 20, the optically detected image information is modulated on spatial frequencies far removed from the central portion of the spectrum at which is concentrated the undiffracted light. A spatial filter 29 consisting of, for example, a binary mask, is appropriately positioned in the central portion of the spatial frequency spectrum to block out the very low frequencies including the undiffracted light. At the same time, the desired image information is superimposed on spatial frequency carriers sufficiently removed on either side of the center block portion to permit passage of the desired optical image information to the image plane 26. Only the object light is spatially filtered and the spatially filtered object light is thereafter combined with the reference light and focused on image plane 26. Intensification of the image can be effected by intercepting the image with a television camera, and displaying it on a kinescope.

In FIG. 3, there is shown elements of a system for converting an acoustic wave field to an optical wave field using an acoustic grating and in which the reflective surface consists of a liquid. As shown in FIG. 2, the acoustic transmissive medium 40 consisting of a fluid such as, for example, water, is confined within tank 41 and a sound field originating from an insonified object 42 propagates toward the liquid surface 43. The object 42 is acoustically "irradiated" by ultrasonic transducer 55 driven by signal generator 56 which can be pulsed in sync with laser source 57. Confined within an enclosure 44 at the liquid surface 43 is a layer 45 of fluid which provides the reflective surface. Liquids of low surface tension and moderate viscosity, such as some silicone oils, are best suited for this purpose. The oil layer 45 is separated from the fluid medium 40 by, for example, a thin polyester membrane 46. Immersed in the fluid 40 immediately below the polyester membrane 46 is an acoustic grating 47 of the type heretofore described with reference to FIG. 1. As a result of the grating 47, the incident acoustic wave field is superimposed on a spatial frequency carrier and the superimposed sound field and spatial carrier are impressed and displayed at the surface of the liquid layer 45 in the form of stationary deformations of the surface resulting from the radiation pressure associated with the wave field. Here, stationary implies that the deformations are stationary for the duration of the insonification, except for transients associated with the pulsing on and then off of the sonic field. The pattern of perturbations at the surface 40 of liquid 45 representative of the object and grating is optically detected by means of coherent light from laser source 57 which is directed towards and illuminates the acoustic wave pattern. Because coherent light is not necessary, quasicoherent light from an arc source can also be used. The reflected light wave field is thereafter focused by lens 58 and optically filtered by spatial filter 60 for separating and displaying the desired image information at image plane 61. The image can also be displayed on a television camera for electronic processing of the image information.

In this case the spatial filter 60 is not required if the target of the television camera is situated slightly out of the image plane at a position in which the phase of the undiffracted light waves reflected from the liquid surface differ by approximately 90° from the phase of the lightwaves diffracted by surface deformations associated with the grating. The image formed on the target of the television camera is thereafter scanned to produce an electrical analog signal having temporal frequency components corresponding to the desired image information superimposed on a carrier frequency produced by scanning across the image formed by the grating, and also frequency components corresponding to the undiffracted light. The electrical signal can thereafter be amplified, filtered and demodulated to extract the frequency components corresponding only to the desired image information. This signal can be displayed on an electrically addressable optical display such as a cathode ray tube.

Electronic processing of the image information is provided in the system shown in FIG. 2. The acoustic components of this acoustic-to-optic image converter are the same as in FIG. 3. The light reflected from surface 45 passes through lens 58 and is imaged on the target 31 of a vidicon or other storage-type television camera 30. The target 31 of the television camera 30 is positioned beyond the Fourier transform plane 60 and in the vicinity of the image plane 61. The target screen 31 of the camera can be moved out of the image plane 61 to a position which produces a maximum response in the amplitude image of the grating or grid 47 as described above. The image formed on target 31 is thereafter scanned to produce an electrical analog signal having temporal frequency components corresponding to the desired image information superimposed on a carrier frequency produced by scanning across the image formed by grating 47, and also frequency components corresponding to the undiffracted light. The electrical signal can thereafter be processed by amplifier 32, filter system 33, and demodulator 34, to extract the frequency components corresponding only to the desired image information. This signal can then be displayed on an electrically addressable optical display such as a cathode ray tube 35.

A variety of acoustic gratings can be utilized to superimpose a spatial frequency carrier on an acoustic wave field incident at the reflected interface. As shown in FIG. 4, the grating consists of a layer 50 of solid material such as plastic in which are formed hollow tubes or channels 51 of the air. The air tubes or channels provide a grating of lines having an acoustic impedance different from the medium in which the grating is immersed. The grating can also be formed by air spaces sandwiched between layers of plastic or other material.

In FIG. 5, the grating consists of an array of wires 52 embedded between sheets of plastic 53. In one example, the grating was formed with lines of 4 mil piano wire spaced apart a distance approximately equal to the diameter of the wire. The wires were sandwiched between layers of plastic having a thickness small with respect to the acoustic wavelength to reduce reflection at the water-plastic interface. Acoustic wavelengths in the range 10 to 20 mils were used but frequencies in the range of 1-20 mc are suitable and the invention is applicable at any acoustic frequency.

In another embodiment the grating is constructed by milling or otherwise forming an appropriate pattern of depressions, such as parallel grooves, in a sheet of plastic or other acoustically transmissive material. This element is subsequently bonded to the thin polyester sheet which supports the surface liquid, and sealed around the edges to produce a grating composed of air spaces immediately below the surface liquid.

In the embodiments of the invention in which spatial filtering is utilized to separate the diffracted from the undiffracted light, the optical grating can consist of a two-dimensional array of wires such as, for example, a screen or even a random array of lines or lengths of material. In the event that electrical filtering is utilized and the image is first scanned by a vidicon, the grating should consist of a row of parallel spaced lines or lengths of material such as that shown in FIGS. 4 and 5 in order to generate a temporal carrier as a result of scanning across the grating lines.

In the following claims, a "deformable" interface or surface for acoustic-to-optical conversion is intended to include both solid elastic and liquid surfaces.

I claim:

1. In a system for converting an acoustic wave field to a light wave field including an acoustically transmissive medium, a deformable reflective interface at a boundary of said medium, means for generating an acoustic wave field in the medium, and means for detecting the acoustic wave field impressed at the deformable reflective interface by light incident on the reflective interface, the improvement comprising: a grating immersed in said medium adjacent to but spaced from the reflective interface for superimposing the acoustic wave field on a spatial frequency carrier wave to facilitate the subsequent light detection on the impressed wave field, said grating formed of a material having an acoustic impedance different from the medium.

2. A system as set forth in claim 1 wherein said grating comprises coplanar parallel lines of material.

3. A system as set forth in claim 1 wherein said grating comprises hollow tubes of air.

4. A system as set forth in claim 3 wherein said grating comprises a solid material having hollow tubes formed therein.

5. A system as set forth in claim 1 wherein said grating comprises an array of wires.

6. A system as set forth in claim 5 wherein said wire grating is embedded in plastic.

7. A system for converting an acoustic wave field to a light wave field as set forth in claim 1 wherein is also provided spatial filter means for spatially filtering light reflected from the reflective interface thereby substantially to eliminate undiffracted portions of the light.

8. A system for converting an acoustic wave field to a light wave field as set forth in claim 1 wherein is also provided means for imaging light reflected from the reflective surface, means for scanning the imaged light pattern thereby to generate an electrical signal having frequency components corresponding to the components of the imaged pattern, and means for electrically filtering said signal to extract signal components corresponding to desired imaged information.

9. A system as set forth in claim 8 wherein is also provided an electronically addressable optical display for displaying the filtered signal components.

10. An acoustic to optical image converter comprising:
    an acoustically transmissive medium in which is immersed an object to be imaged;
    means for insonifying an object immersed in the medium thereby to generate an acoustic wave field representative of the object;
    means for modulating the acoustic wave field on a spatial frequency carrier wave;
    a reflective deformable surface positioned at a boundary of the medium for displaying the modulated acoustic wave field originating from the insonified object;
    means for optically detecting and visualizing the modulated acoustic image displayed on said reflective surface by light incident on the reflective surface.

11. An acoustic to optical image converter as set forth in claim 10 wherein is also provided means for spatially filtering the light reflected from the reflective surface.

12. A acoustic to optical image converter as set forth in claim 10 wherein is also provided means for demodulating the optically detected image information from the spatial frequency carrier wave.

13. An acoustic to optical image converter as set forth in claim 10 wherein is provided means for imaging light reflected from the reflective surface, means for scanning the imaged light pattern thereby to generate an electrical signal having frequency components corresponding to the components of the imaged pattern, and means for electrically filtering said signal to extract signal components to desired image information.

14. A system as set forth in claim 13 wherein is also provided an electronically addressable optical display for displaying the filtered signal components.

15. An acoustic to optical image converter as set forth in claim 13, wherein is also provided spatial filter means in the Fourier transform plane of the imaged coherent light.

16. In a system for converting an acoustic wave field to a light wave field including an acoustically transmissive medium, a deformable reflective interface at a boundary of said medium, means for generating an acoustic wave field in the medium, and means for detecting the acoustic wave field impressed at the reflective interface by light incident on the reflective interface, the improvement comprising:
   a grating immersed in said medium adjacent to but spaced from the reflective interface for superimposing the acoustic wave field on a spatial frequency carrier wave to spatially offset the wave field impressed on the interface, said grating being formed of a material having an acoustic impedance different from the medium;
   means for forming an image from the light reflected from the reflective interface;
   and means for filtering undiffracted light components reflected by the reflective interface from the formed image.

17. A system as set forth in claim 16 wherein said filtering means comprises spatial filter means.

18. A system as set forth in claim 16 wherein said image forming means includes scanning means for generating an electrical signal and an electronically addressable optical display and wherein said filtering means comprises electrical filtering means for filtering electrical signal components corresponding to desired image information.

19. A system as set forth in claim 16 wherein said filtering means includes both electrical and spatial filtering means.

20. An acoustic grating for use in acoustic to optical image converters for superimposing an acoustic wave field on a spatial frequency carrier wave comprising:
   a layer of solid material having air channels formed therein.

21. An acoustic grating for use in acoustic to optical image converters for superimposing an acoustic wave field on a spatial frequency carrier wave comprising:
   an array of air spaces sandwiched between layers of plastic.

22. An acoustic grating for use in acoustic to optical image converters for superimposing an acoustic wave field on a spatial frequency carrier wave comprising an array of wires sandwiched between layers of plastic.

23. A method for acoustic to optical image conversion comprising:
   immersing an object to be imaged in an acoustically transmissive medium;
   insonifying the object immersed in the medium thereby generating an acoustic wave field representative of the object;
   superimposing said acoustic wave field representative of the object on a spatial frequency acoustic carrier wave in the medium;
   impressing and displaying the modulated spatial frequency acoustic carrier wave on a reflective deformable surface positioned at the boundary of the medium;
   optically illuminating the displayed spatial frequency acoustic carrier wave modulated with the acoustic wave field representative of the object with coherent light and optically imaging the reflected light;
   electronically scanning the so formed optical image to generate an electrical signal comprising signal components corresponding to the acoustic wave field components;
   and electrically filtering said electrical signal to separate desired image information signal components.

24. A method for converting an acoustic wave field to a light wave field comprising:
   insonifying an object to be imaged thereby generating an acoustic wave field representative of the object;
   superimposing the acoustic wave field on a spatial frequency acoustic carrier wave;
   impressing the acoustic carrier wave modulated by the acoustic wave field representative of the object on a deformable reflective surface;
   and illuminating the deformable surface with coherent light and imaging the reflected light to form an image of said surface.

* * * * *